US009961007B2

(12) United States Patent
Khay-Ibbat et al.

(10) Patent No.: US 9,961,007 B2
(45) Date of Patent: *May 1, 2018

(54) DEVICE-INITIATED CODEC RATE CHANGE DURING A VOICE CALL

(71) Applicant: Apple Inc., Cupertino, CA (US)

(72) Inventors: Samy Khay-Ibbat, San Francisco, CA (US); Sarma V. Vangala, San Jose, CA (US); Sreevalsan Vallath, Dublin, CA (US); Tarik Tabet, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 15/012,680

(22) Filed: Feb. 1, 2016

(65) Prior Publication Data
US 2016/0226785 A1 Aug. 4, 2016

Related U.S. Application Data

(63) Continuation of application No. 14/042,500, filed on Sep. 30, 2013, now Pat. No. 9,253,238.

(51) Int. Cl.
H04L 12/811 (2013.01)
H04L 29/06 (2006.01)
(Continued)

(52) U.S. Cl.
CPC ............ H04L 47/38 (2013.01); H04L 65/601 (2013.01); H04L 65/602 (2013.01);
(Continued)

(58) Field of Classification Search
CPC .. H04L 1/0047; H04L 5/0058; H04W 74/002; H04W 76/022; H04W 36/18
See application file for complete search history.

(56) References Cited

U.S. PATENT DOCUMENTS 8,467,380 B2 6/2013 Zhou et al.
8,468,380 B2 6/2013 Munjal et al.
(Continued)

FOREIGN PATENT DOCUMENTS

JP 2012104894 A 5/2012
JP 2012169868 A 9/2012
(Continued)

OTHER PUBLICATIONS

International Application No. PCT/US2014/049029—International Search Report & Written Opinion dated Nov. 11, 2014.
(Continued)

Primary Examiner — Chandrahas B Patel
(74) Attorney, Agent, or Firm — Downey Brand LLP

(57) ABSTRACT

A method for initiating a codec rate change during a VoIP call by a wireless communication device is disclosed. The method can include the wireless communication device establishing a first codec rate for use in the VoIP call during a call establishment phase; using the first codec rate to encode voice data for transmission during a first portion of the VoIP call; determining a channel quality while using the first codec rate; determining that the channel quality satisfies a threshold for requesting a codec rate change; requesting a codec rate change from the first codec rate to a second codec rate in response to the channel quality satisfying the threshold; and using the second codec rate to encode voice data for transmission during a second portion of the VoIP call.

20 Claims, 8 Drawing Sheets

(51) Int. Cl.
*H04W 24/08* (2009.01)
*H04W 28/02* (2009.01)

(52) U.S. Cl.
CPC .......... *H04L 65/604* (2013.01); *H04L 65/608* (2013.01); *H04L 65/80* (2013.01); *H04W 24/08* (2013.01); *H04W 28/0236* (2013.01)

(56) References Cited

U.S. PATENT DOCUMENTS

| | | | |
|---|---|---|---|
| 9,338,580 B2 * | 5/2016 | Swaminathan | ....... H04L 1/0002 |
| 2008/0013528 A1 | 1/2008 | Miller et al. | |
| 2010/0172332 A1 | 7/2010 | Rao | |
| 2010/0284278 A1 | 11/2010 | Alanara | |
| 2010/0318670 A1 | 12/2010 | Al-Shalash et al. | |
| 2011/0122786 A1 | 5/2011 | Koo et al. | |
| 2011/0280296 A1 | 11/2011 | Wang et al. | |
| 2012/0014275 A1 | 1/2012 | Koo et al. | |
| 2012/0218899 A1 | 8/2012 | Ozawa | |
| 2012/0307922 A1 | 12/2012 | Simonsson et al. | |
| 2013/0044613 A1 | 2/2013 | Edara et al. | |
| 2013/0045765 A1 | 2/2013 | Laitinen et al. | |
| 2014/0010185 A1 | 1/2014 | Morita et al. | |

FOREIGN PATENT DOCUMENTS

| | | |
|---|---|---|
| TW | I297248 B | 5/2008 |
| TW | 201032549 A | 9/2010 |
| WO | 2012075387 A1 | 6/2012 |
| WO | 2013050061 A1 | 4/2013 |

OTHER PUBLICATIONS

VoLTE Deployment and the Radio Access Network the LTE User Equipment Perspective, SPIRENT, Aug. 2012.
GSM Association, IR.36—Adaptive Multirate Wide Band V2.0. Publication Feb. 21, 2013.
Taiwanese Patent Application No. 103128499—Office Action and Search Report dated Jun. 24, 2016.

* cited by examiner

US 9,961,007 B2

DEVICE-INITIATED CODEC RATE CHANGE DURING A VOICE CALL

CROSS REFERENCE TO RELATED APPLICATIONS

This application is a continuation of U.S. patent application Ser. No. 14/042,500, filed Sep. 30, 2013. The above identified application is incorporated by reference herein in its entirety.

FIELD OF THE DESCRIBED EMBODIMENTS

The described embodiments relate generally to communication technology and more particularly to initiation of a codec rate change by a wireless communication device during a voice over Internet Protocol (VoIP) call.

BACKGROUND

Wireless communication devices participating in a VoIP call, such as a voice over Long Term Evolution (VoLTE) call, can use an audio codec to encode and decode audio data exchanged during the call. Audio codecs can have a codec rate, which can define a bit rate used to encode audio data, and thus the size of an audio data packet resulting from encoding an audio data sample (usually 20 milliseconds of audio data in VoLTE calls) at the codec rate.

The amount of data that a wireless communication device can send and/or receive over a radio link that can be used to support a VoIP call can depend on radio frequency (RF) channel conditions. As such, the codec rate selected for use during call establishment can be selected based on channel conditions existing at the outset of the call. However, channel conditions can fluctuate over time, and a wireless communication device can experience a wide range of condition during a communication session. For example, a wireless communication device participating in a call can enter an area with poor RF conditions during the call, and can be unable to successfully send encapsulated vocoder packets encoded at the codec rate chosen during the call establishment phase. This inability to successfully send encapsulated vocoder packets can cause interruptions in the call and, in some instances, can even cause the call to drop, thus negatively impacting user experience.

BRIEF SUMMARY OF SOME DISCLOSED EMBODIMENTS

Some embodiments disclosed herein provide for initiation of a codec rate change by a wireless communication device during a VoIP call, such as a VoLTE call. More particularly, a wireless communication device in accordance with some example embodiments can request a codec rate change during a call in response to determining that a channel quality observed by the wireless communication device satisfies a defined threshold for requesting a codec rate change. For example, in some embodiments, channel quality can be observed at a physical layer of a wireless communication device and, if an observed channel quality satisfies a threshold for requesting a codec rate change, the device can request a codec rate change at a real-time transport protocol (RTP) layer of the device. As such, if channel conditions degrade during a call, the device can initiate a codec rate change to a lower codec rate to enable successful transmission of encoded voice data in the degraded channel conditions. Further, in some example embodiments, if channel conditions improve to a point that a higher codec rate can be accommodated, a codec rate change to a higher codec rate can be requested so that higher quality audio can be provided in the call. Accordingly, user experience can be improved by reduced audio interruptions and call drops. Further, in some embodiments, user experience can be improved in an instance in which channel conditions improve during the call by switching to a higher codec rate providing a higher audio quality.

In a first example embodiment, a method for initiating a codec rate change during a VoIP call by a wireless communication device is provided. The VoIP call can, for example, be a VoLTE call. The method can include the wireless communication device establishing a first codec rate for use in the VoIP call during a call establishment phase; using the first codec rate to encode voice data for transmission during a first portion of the VoIP call; determining a channel quality while using the first codec rate; determining that the channel quality satisfies a threshold for requesting a codec rate change; requesting a codec rate change from the first codec rate to a second codec rate in response to the channel quality satisfying the threshold; and using the second codec rate to encode voice data for transmission during a second portion of the VoIP call.

In some implementations of the first example embodiment, the wireless communication device can include a physical layer and an RTP layer. In some such implementations, the channel quality can be determined at the physical layer and the codec rate change can be requested at the RTP layer in response to an indication being provided to the RTP layer that the channel quality satisfies the threshold for requesting a codec rate change.

In a second example embodiment, a wireless communication device comprising a transceiver and processing circuitry coupled with the transceiver is provided. The transceiver can be configured to transmit data and receive data via a wireless network. In some implementations, the transceiver can be configured to transmit data and receive data via a Long Term Evolution (LTE) network. The processing circuitry can be configured to control the wireless communication device to establish a first codec rate for use in a VoIP call during a call establishment phase. The VoIP call can, for example, be a VoLTE call. The processing circuitry can be further configured to control the wireless communication device to use the first codec rate to encode voice data for transmission during a first portion of the VoIP call; determine a channel quality while using the first codec rate; determine that the channel quality satisfies a threshold for requesting a codec rate change; request a codec rate change from the first codec rate to a second codec rate in response to the channel quality satisfying the threshold; and use the second codec rate to encode voice data for transmission during a second portion of the VoIP call.

In some implementations of the second example embodiment, the wireless communication device can include a physical layer and an RTP layer. In some such implementations, the processing circuitry can be configured to further control the wireless communication device to determine the channel quality at the physical layer; provide an indication to the RTP layer that the channel quality satisfies the threshold; and request the codec rate change at the RTP layer in response to the indication that the channel quality satisfies the threshold.

In a third example embodiment, a computer program product for initiating a codec rate change during a VoIP call by a wireless communication device is provided. The VoIP call can, for example, be a VoLTE call. The computer program product can include at least one non-transitory computer readable storage medium having computer program code stored thereon. The computer program code of the third example embodiment can include program code for establishing a first codec rate for use in the VoIP call during a call establishment phase; program code for using the first codec rate to encode voice data for transmission during a first portion of the VoIP call; program code for determining a channel quality while using the first codec rate; program code for determining that the channel quality satisfies a threshold for requesting a codec rate change; program code for requesting a codec rate change from the first codec rate to a second codec rate in response to the channel quality satisfying the threshold; and program code for using the second codec rate to encode voice data for transmission during a second portion of the VoIP call.

In some implementations of the third example embodiment, the wireless communication device can include a physical layer and an RTP layer. In some such implementations, the computer program code can include program code for determining the channel quality at the physical layer; program code for providing an indication to the RTP layer that the channel quality satisfies the threshold; and program code for requesting the codec rate change at the RTP layer in response to the indication that the channel quality satisfies the threshold.

In a fourth example embodiment, an apparatus for initiating a codec rate change during a VoIP call by a wireless communication device is provided. The VoIP call can, for example, be a VoLTE call. The apparatus of the fourth example embodiment can include means for establishing a first codec rate for use in the VoIP call during a call establishment phase; means for using the first codec rate to encode voice data for transmission during a first portion of the VoIP call; means for determining a channel quality while using the first codec rate; means for determining that the channel quality satisfies a threshold for requesting a codec rate change; means for requesting a codec rate change from the first codec rate to a second codec rate in response to the channel quality satisfying the threshold; and means for using the second codec rate to encode voice data for transmission during a second portion of the VoIP call.

In some implementations of the fourth example embodiment, the wireless communication device can include a physical layer and an RTP layer. In some such implementations, the apparatus can include means for determining the channel quality at the physical layer; means for providing an indication to the RTP layer that the channel quality satisfies the threshold; and means for requesting the codec rate change at the RTP layer in response to the indication that the channel quality satisfies the threshold.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Various example embodiments disclosed herein can enable a wireless communication device to more readily adapt to changing channel conditions during a VoIP call, such as a VoLTE call, thereby improving user experience. In this regard, some example embodiments provide a wireless communication device configured to request a codec rate change during a call in response to determining that a channel quality observed by the wireless communication device satisfies a defined threshold for requesting a codec rate change. As such, if channel conditions degrade during a call, the wireless communication device of some example embodiments can initiate a codec rate change to a lower codec rate to enable successful transmission of encoded voice data in the degraded channel conditions. Accordingly, user experience can be improved by reduced audio interruptions and call drops. Further, in some example embodiments, if channel conditions improve to a point that a higher codec rate can be accommodated, a codec rate change to a higher codec rate can be requested so that higher quality audio can be provided in the call, thereby improving user experience.

Figure 1:
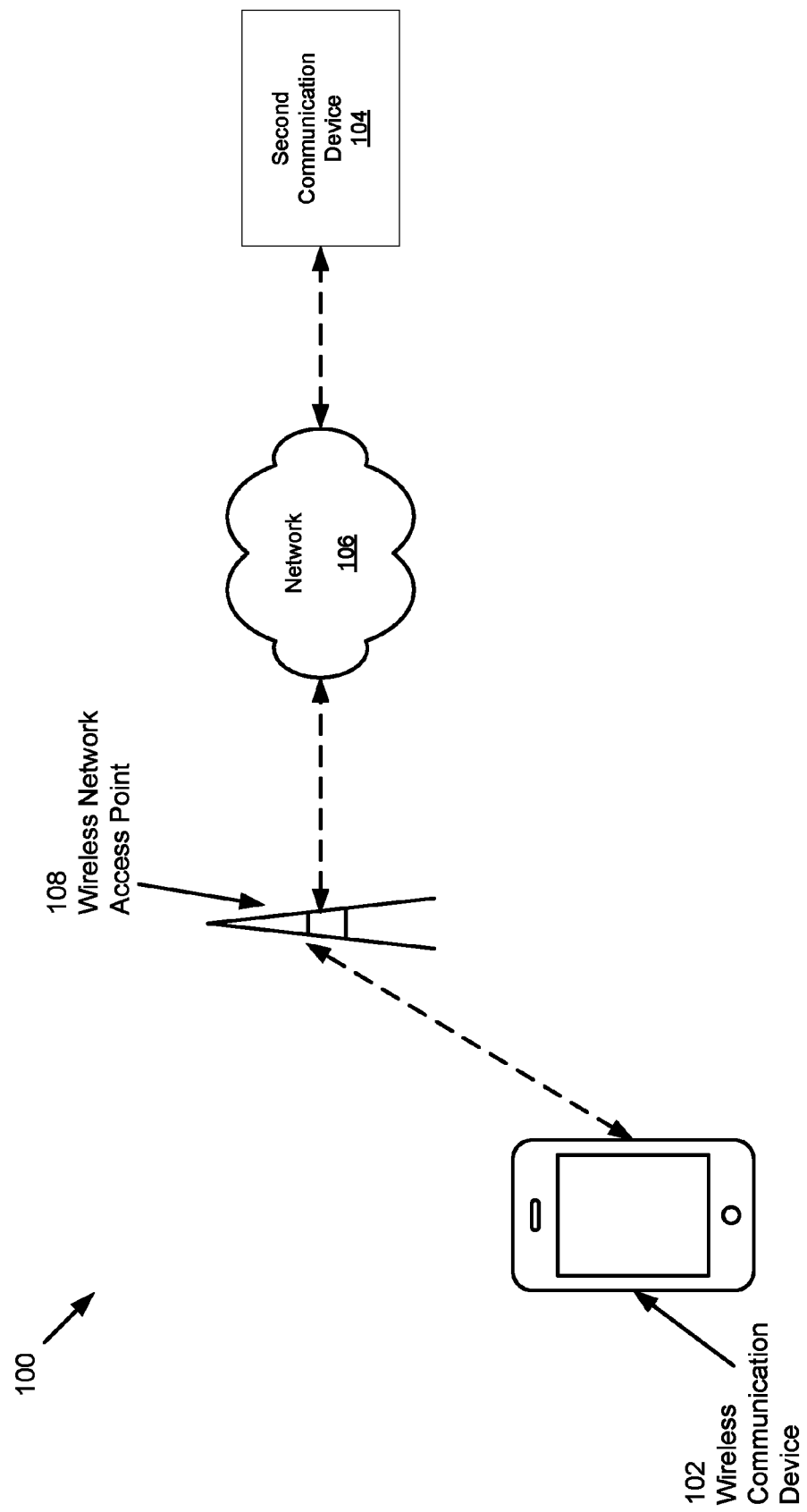
FIG. 1 illustrates a wireless communication system in accordance with some example embodiments.

FIG. 1 illustrates a wireless communication system 100 in accordance with some example embodiments. The wireless communication system 100 can include a plurality of communication devices, including the wireless communication device 102 and second communication device 104.

The wireless communication device 102 can be any communication device configured to wirelessly access a network, such as the network 106, via a radio access technology (RAT) and engage in a communication session with another device over the network. By way of non-limiting example, the wireless communication device 102 can be embodied as a cellular phone, such as a smart phone device, a tablet computing device, a laptop computing device, or other computing device that can be configured to wirelessly access a network.

As illustrated in FIG. 1, the wireless communication device 102 can wirelessly access network 106 via the wireless network access point 108. The wireless network access point 108 can be embodied as any access point that can be configured to wirelessly provide network access to a wireless communication device, such as wireless communication device 102. For example, in some embodiments, wireless network access point 108 can be embodied as a cellular base station, such as, by way of non-limiting example, a base transceiver station (BTS), node B, evolved node B (eNB), femtocell, and/or other type of cellular base station. As a further example, in some embodiments, wireless network access point 108 can be embodied as a wireless local area network (WLAN) access point, such as a wireless router, wireless bridge, and/or other type of access point that can be used to access a WLAN. It will be appreciated, however, that the foregoing example embodiments of the wireless network access point 108 are non-limiting, and that the embodiment of the wireless network access point 108 can vary depending on a type of RAT used for communication between the wireless communication device 102 and wireless network access point 108.

Any present or future RAT capable of supporting a VoIP call can be used for communication between wireless communication device 102 and wireless network access point 108 within the scope of the disclosure. For example, in some embodiments, such as in some embodiments in which wireless network access point 108 is embodied as a cellular base station, a cellular RAT supporting VoIP communication can be used for communication between wireless communication device 102 and wireless network access point 108. For example, in some embodiments in which a cellular RAT is used, a fourth generation (4G) RAT, such as an Long Term Evolution (LTE) RAT capable of supporting VoLTE calls, including LTE, LTE-Advanced (LTE-A), and/or the like can be used for communication between wireless communication device 102 and wireless network access point 108. It will be appreciated, however, that LTE and other 4G cellular RATs are provided by way of example, and not by way of limitation. In this regard, other present or future developed cellular RATs, including various fifth generation (5G) RATs now in development, that can support VoIP calls can be used for communication between wireless communication device 102 and wireless network access point 108 within the scope of the disclosure.

In some example embodiments, a non-cellular RAT can be used for communication between wireless communication device 102 and wireless network access point 108. For example, in some embodiments, such as some embodiments in which wireless network access point 108 is embodied as a WLAN access point, a WLAN RAT, such as an Institute of Electrical and Electronics Engineers (IEEE) standardized Wi-Fi RAT (e.g., IEEE 802.11 a/b/g/n/ac/ad/etc.), can be used for communication between wireless communication device 102 and wireless network access point 108. In this regard, it will be appreciated that any RAT capable of supporting VoIP calls can be used for communication between the wireless communication device 102 and wireless network access point 108 within the scope of the disclosure.

The second communication device 104 can be any communication device that can be configured to participate in a voice call with one or more further communication devices, such as wireless communication device 102. In some example embodiments, the second communication device 104 can also be a wireless communication device, and thus can be embodied similarly to wireless communication device 102 and can access the network 106 via a wireless connection to a wireless network access point, such as a wireless network access point 108. In such embodiments, the second communication device 104 can use any present or future RAT, including, for example, one or more of the RATs described above with respect to the wireless communication device 102 to access the network 106 and engage in a voice call with the wireless communication device 102. It will be appreciated, however, that in some embodiments, second communication device 104 can access the network 106 and participate in a communication session with wireless communication device 102 via a wireline connection to the network 106.

In some example embodiments in which the second communication device 104 can wirelessly access the network 106 to engage in a voice call with wireless communication device 102, the second communication device 104 can also use a VoIP connection to support the voice call, such that the voice call can be an end-to-end VoIP call. For example in some example embodiments in which both the wireless communication device 102 and second communication device 104 access a network (or networks) using an LTE RAT, the wireless communication device 102 and second communication device 104 can engage in an end-to-end VoLTE call.

The network 106 can be embodied as any network or combination of networks that can support a voice call and/or other communication between two or more communication devices, such as wireless communication device 102 and second communication device 104. By way of non-limiting example, the network 106 can include one or more wireless networks (e.g., one or more cellular networks, one or WLANs, and/or the like), one or more wireline networks, or some combination thereof, and, in some example embodiments, can include the Internet. In some example embodiments, the network 106 can be configured to support end-to-end Internet Protocol (IP) communication such that a call between the wireless communication device 102 and second communication device 104 can be supported as an end-to-end VoIP call. For example, in some example embodiments, the network 106 can include an IP Multimedia Subsystem (IMS) configured to support a VoLTE and/or other VoIP call between the wireless communication device 102 and second communication device 104.

The wireless communication device 102 and second communication device 104 can be configured to establish a voice call and/or other communication session with each other via any technique that can be used to initiate and establish a communication session. For example, in some embodiments, one of the wireless communication device 102 and second communication device 104 (e.g., the calling communication device) can place a call to the other of the wireless communication device 102 and second communication device 104 (e.g., the called communication device) to initiate a voice call.

Figure 2:
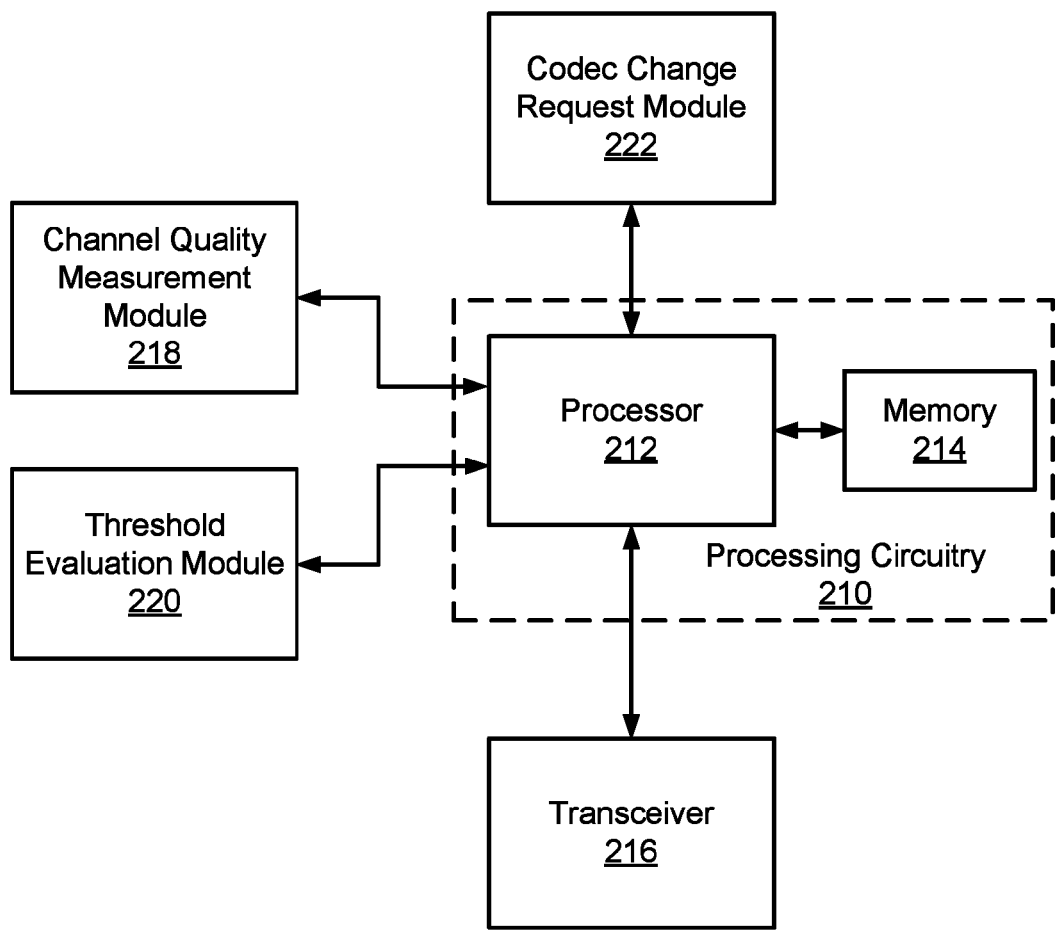
FIG. 2 illustrates a block diagram of an apparatus that can be implemented on a wireless communication device in accordance with some example embodiments.

FIG. 2 illustrates a block diagram of another example apparatus that can be implemented on a communication device, such as wireless communication device 102 and/or second communication device 104, in accordance with some embodiments. In this regard, FIG. 2 illustrates an apparatus 200 that can, when implemented on a computing device, such as wireless communication device 102 and/or second communication device 104, enable the computing device to operate within the system 100 in accordance with one or more example embodiments. It will be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some example embodiments, the apparatus 200 can include processing circuitry 210 that is configurable to perform actions in accordance with one or more example embodiments disclosed herein. In this regard, the processing circuitry 210 can be configured to perform and/or control performance of one or more functionalities of a communication device in accordance with various example embodiments, and thus can provide means for performing functionalities of a communication device, such as wireless communication device 102 and/or second communication device 104, in accordance with various example embodiments. The processing circuitry 210 can be configured to perform data processing, application execution and/or other processing and management services according to one or more example embodiments.

In some embodiments, the apparatus 200 or a portion(s) or component(s) thereof, such as the processing circuitry 210, can include one or more chipsets, which can each include one or more chips. The processing circuitry 210 and/or one or more further components of the apparatus 200 can therefore, in some instances, be configured to implement an embodiment on a single chip or chipset. In some example embodiments in which one or more components of the apparatus 200 are embodied as a chipset, the chipset can be capable of enabling a computing device to operate in the system 100 when implemented on or otherwise operably coupled to the computing device. For example, in some embodiments, one or more components of the apparatus 200 can provide a physical layer interface chipset, such as a cellular baseband chipset, that can be used to support communication with the wireless network access point 108.

In some example embodiments, the processing circuitry 210 can include a processor 212 and, in some embodiments, such as that illustrated in FIG. 2, can further include memory 214. The processing circuitry 210 can be in communication with or otherwise control a transceiver 216, channel quality measurement module 218, threshold evaluation module 220, and/or codec change request module 222.

The processor 212 can be embodied in a variety of forms. For example, the processor 212 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. The plurality of processors can be in operative communication with each other and can be collectively configured to perform one or more functionalities of a communication device as described herein. In some example embodiments, the processor 212 can be configured to execute instructions that can be stored in the memory 214 or that can be otherwise accessible to the processor 212. As such, whether configured by hardware or by a combination of hardware and software, the processor 212 capable of performing operations according to various embodiments while configured accordingly.

In some example embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions and/or the like for enabling the apparatus 200 to carry out various functions in accordance with one or more example embodiments. In some embodiments, the memory 214 can be in communication with one or more of the processor 212, transceiver 216, channel quality measurement module 218, threshold evaluation module 220, or codec change request module 222 via a bus (or buses) for passing information among components of the apparatus 200.

The apparatus 200 can further include a transceiver 216. The transceiver 216 can be configured to enable the apparatus 200 to send (e.g., transmit) wireless signals to and receive signals from a wireless network via a connection to a wireless network access point, such as the wireless network access point 108. As such, the transceiver 216 can be configured to support any type of RAT that may be used to support communication over a wireless channel between a communication device and a network. Thus, for example, the transceiver 216 can be configured to support communication via any type of RAT that can be used for communication between a wireless communication device and a wireless network access point 108.

The apparatus 200 can further include the channel quality measurement module 218. The channel quality measurement module 218 can be embodied as various means, such as circuitry, hardware, a computer program product comprising a computer readable medium (for example, the memory 214) storing computer readable program instructions that are executable by a processing device (for example, the processor 212), or some combination thereof. In some example embodiments, the channel quality measurement module 218 can be at least partially implemented by a physical layer of a wireless communication device, such as wireless communication device 102.

The channel quality measurement module 218 can be configured to measure and/or otherwise observe channel conditions during a VoIP call. In this regard, the channel quality measurement module 218 can be configured to measure and/or otherwise observe any metric that can be indicative of a channel condition (e.g., an RF condition) of a channel used to support a VoIP call.

For example, in some embodiments, the channel quality measurement module 218 can be configured to measure a signal quality of a channel. The measured signal quality can, for example, include measurement of a reference signal received power (RSRP), received signal strength indicator (RSSI), reference signal received quality (RSRQ), and/or the like for the channel.

As another example, the channel quality measurement module 218 of some example embodiments can be configured to determine an error rate encountered in a VoIP call on the uplink (UL) and/or on the downlink (DL). For example, the channel quality measurement module 218 of some example embodiments can be configured to determine an error rate based on Hybrid Automatic Repeat Request (HARD) processing for data received on the DL. Additionally or alternatively, the channel quality measurement module 218 of some example embodiments can be configured to determine an error rate for the UL based on a quantity of non-acknowledgements (NACKs) and/or acknowledgements (ACKs) received from the network.

As yet a further example, the channel quality measurement module 218 of some example embodiments can be configured to determine a resource grant and/or other allocation by a serving network that can be indicative of a channel quality. For example, in some embodiments, the channel quality measurement module 218 can be configured to determine a modulation and coding scheme (MCS) allocation (e.g., a past and/or present MCS allocation) allocated to a wireless communication device on which the apparatus 200 is implemented.

The apparatus 200 can also include threshold evaluation module 220. The threshold evaluation module 220 can be embodied as various means, such as circuitry, hardware, a computer program product comprising a computer readable medium (for example, the memory 214) storing computer readable program instructions that are executable by a processing device (for example, the processor 212), or some combination thereof.

The threshold evaluation module 220 can be configured to apply channel quality thresholds for requesting a codec rate change in accordance with various example embodiments. In this regard, in some example embodiments, a given codec rate can have a defined association with one or more thresholds for requesting a codec rate change. In some example embodiments, each respective codec rate that can be used by a wireless communication device in a call can have an associated threshold(s) for requesting a codec rate change. In this regard, as the codec rate can affect the size of an encoded vocoder packet, each respective codec rate can have an associated channel quality threshold(s) that can be defined based on the size of a vocoder packet encoded at the codec rate. Thus, for example, a threshold channel quality can be defined such that if channel conditions degrade below the threshold channel quality, a lower codec rate can be requested to improve the likelihood of successful transmission of encoded audio data (e.g., encoded vocoder packets) at the given RF conditions.

In some example embodiments, a codec rate can have a defined association with both one or more good channel quality thresholds for requesting codec rate increase (e.g., in good, or improving channel conditions) and one or more poor channel quality thresholds for requesting a codec rate decrease (e.g., in poor, or degrading channel conditions) such that the good channel quality threshold(s) and poor channel quality threshold(s) can define a window of channel conditions in which the codec rate is used. If channel conditions improve to exceed a good channel quality threshold, a higher codec rate can be requested, as the channel can support larger vocoder packets, which can provide higher audio quality. Similarly, if channel conditions degrade below a poor channel quality threshold, a lower codec rate can be requested to improve the likelihood of successful transmission of encoded audio data.

The threshold evaluation module 220 can accordingly be configured to compare a channel quality measured by the channel quality measurement module 218 to a threshold associated with a codec rate being used to encode audio data for transmission in a VoIP call to determine if a codec rate change should be requested. For example, if the channel quality measurement module 218 measures a signal quality, such as RSRP, RSSI, RSRQ, and/or the like, the threshold evaluation module 220 can be configured to compare the measured signal quality to a threshold signal quality, such as a threshold RSRP, threshold RSSI, threshold RSRQ, and/or the like. In this regard, if a measured signal quality is less than a threshold signal quality indicative of a poor channel quality for the codec rate being used, a threshold for requesting a lower codec rate can be satisfied. Similarly, for example, if a measured signal quality is greater than a threshold signal quality indicative of good channel quality, then a threshold for requesting a higher codec rate can be satisfied.

As a further example, if the channel quality measurement module 218 determines an error rate encountered in a VoIP call, the threshold evaluation module 220 can be configured to compare the experienced error rate to a threshold error rate. Thus, for example, if the error rate exceeds a threshold error rate indicative of a poor channel quality for the codec rate being used, a threshold for requesting a lower codec rate can be satisfied. Similarly, for example, if the error rate is less than a threshold signal quality indicative of good channel quality, then a threshold for requesting a higher codec rate can be satisfied.

As yet another example, if the channel quality measurement module 218 determines a resource allocation, such as an MCS allocation, the threshold evaluation module 220 can be configured to evaluate whether the allocated resource satisfies a resource threshold sufficient to accommodate the size of a voice packet (e.g., a vocoder packet) encoded at the current codec rate. For example, in some embodiments, the threshold evaluation module 220 can be configured to determine whether a voice packet encoded at the current voice packet will fit into a single transmission time interval (TTI) given the MCS allocation. In this regard, the amount of data that a wireless communication device can transmit on an UL in a single TTI can be defined at least in part by an MCS allocation. Thus, for example, if the threshold evaluation module 220 determines that a voice packet encoded at the present codec rate is too large to transmit in a single TTI given the MCS allocation, the threshold evaluation module 220 can determine that a threshold for requesting a lower codec rate has been satisfied.

In some example embodiment, the threshold evaluation module 220 can be configured to determine that a threshold for requesting a codec rate change has been satisfied only if the channel quality has satisfied the threshold for more than a single channel quality measurement. For example, in some example embodiments, the threshold evaluation module 220 can be configured to determine that a threshold for requesting a codec rate change has been satisfied if the channel quality has satisfied the threshold for an amount of time exceeding some threshold period of time, such as can be measured with a timer. As a further example, in some example embodiments, the threshold evaluation module 220 can be configured to determine that a threshold for requesting a codec rate change has been satisfied if there have been a defined number, n, channel quality measurements that have satisfied the threshold. For example, in some embodiments, the threshold evaluation module 220 can be configured to determine that a codec rate change should be requested only if the last n consecutive channel quality measurements provided by the channel quality measurement module 218 have satisfied the threshold. As another example, in some embodiments, the threshold evaluation module 220 can be configured to determine that a codec rate change should be requested only if n of the last m, where m is an integer larger than n, channel quality measurements provided by the channel quality measurement module 218 have satisfied the threshold. In this regard, the threshold evaluation module 220 of some example embodiments can be configured to evaluate whether a threshold has been satisfied over a period of time to avoid ping ponging between codec rates in response to a transient channel condition.

The apparatus 200 can further include codec change request module 222. The codec change request module 222 can be embodied as various means, such as circuitry, hardware, a computer program product comprising a computer readable medium (for example, the memory 214) storing computer readable program instructions that are executable by a processing device (for example, the processor 212), or some combination thereof. In some example embodiments, the codec change request module 222 can be at least partially implemented within an RTP layer of a wireless communication device, such as wireless communication device 102.

In an instance in which a threshold for requesting a codec rate change is determined to be satisfied by the threshold evaluation module 220, the threshold evaluation module 220 can be configured to provide an indication that the channel quality satisfies a threshold for requesting a codec rate change to the codec change request module 222. In some example embodiments, the indication can include an indication of whether a good channel quality threshold has been satisfied such that an increased codec rate should be requested or whether a poor channel quality threshold has been satisfied such that a lower codec rate should be requested. In some example embodiments, the indication can specify a codec rate that should be requested. However, in some example embodiments, the exact codec rate to be requested can be understood based on predefined policy (e.g., one codec rate level higher than the present codec rate or one codec rate lower than the present codec rate) or, in some embodiments, can be left to the discretion of the codec change request module 222.

The codec change request module 222 can be configured to request a codec rate change to another codec rate in response to the indication. For example, in some embodiments, the codec change request module 222 can be configured to format and send a codec mode request (CMR) message requesting a change in codec rate.

In some example embodiments, a request to change codec rate, such as a CMR message, can be sent to another device participating in the VoIP call. For example, in some embodiments, the wireless communication device 102 can be configured to send a request to change codec rate to the second communication device 104.

Additionally or alternatively, in some example embodiments, a request to change codec rate, such as a CMR message, can be sent to a network entity that can be responsible for arbitrating codec rate change requests. For example, in some embodiments, a request to change the codec rate can be sent to wireless network access point 108, a core network entity, or an IMS entity, such as a Multimedia Telephony Service for IMS (MTSI) media gateway (MGW).

Figure 3:
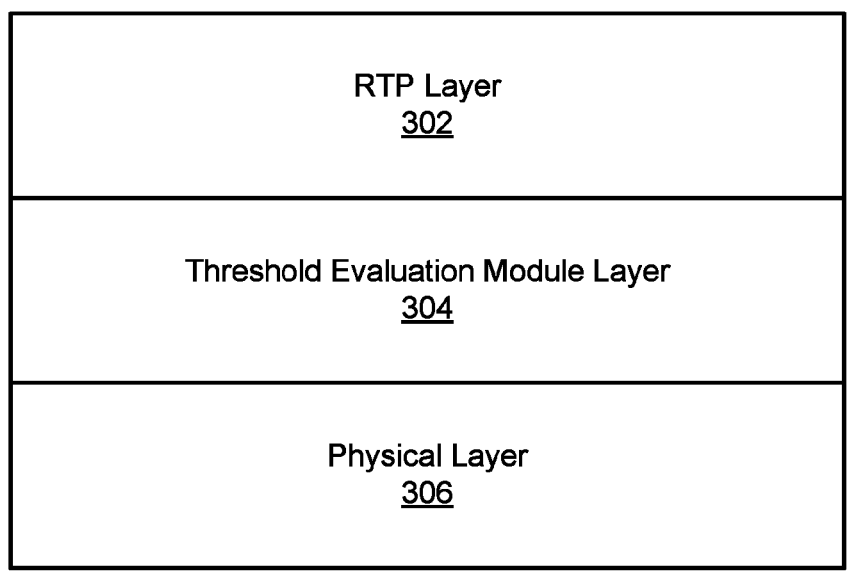
FIG. 3 illustrates a system layer diagram of example system layers that can be implemented on a wireless communication device in accordance with some example embodiments.

FIG. 3 illustrates a system layer diagram 300 of example system layers that can be implemented on a wireless communication device, such as wireless communication device 102, in accordance with some example embodiments. The system layers can include an RTP layer 302. The RTP layer 302 can be a transport layer (e.g., layer 4 in the Open Systems Interconnection model), which can be responsible for providing end-to-end communication services for a VoIP call. In some example embodiments, the codec change request module 222 can be implemented within and/or can be configured to control at least some functionality of the RTP layer 302 such that a request for a codec rate change can be performed at the RTP layer 302 in some example embodiments.

The system layers can further include physical layer 306, which can be the physical (PHY) layer, or layer 1 in the Open Systems Interconnection model. The physical layer 306 can include the networking hardware, such as transceiver 216 to support communication with the wireless network access point 108 in support of a VoIP call. In some example embodiments, the channel quality measurement module 218 can be implemented within and/or can be configured to control at least some functionality of the physical layer 306 such that a channel quality can be determined at the physical layer 306 in some example embodiments.

A threshold evaluation module layer 304 can function as an intermediary between the RTP layer 302 and the physical layer 306. The threshold evaluation module layer 304 can, for example, be an embodiment of threshold evaluation module 220. The threshold evaluation module layer 304 can be configured to evaluate a channel quality determined at the physical layer 306 to determine if a threshold for requesting a codec rate change has been satisfied. If a threshold for requesting a codec rate change has been satisfied, the threshold evaluation module layer 304 can be configured to provide an indication to the RTP layer 302 to prompt the RTP layer 302 to request a codec rate change.

In some example embodiments, the threshold evaluation module layer 304 can be implemented within an intermediary layer disposed between the RTP layer 302 and physical layer 306 that is configured to interact with both the RTP layer 302 and the physical layer 306, as illustrated in FIG. 3. However, in some example embodiments, the threshold evaluation module layer 304 can be implemented at least partially within the physical layer 306 such that evaluation of whether a threshold for requesting a codec change has been satisfied can be performed within the physical layer 306 of some example embodiments. Alternatively, in some example embodiments, the threshold evaluation module layer 304 can be implemented at least partially within the physical layer 306 such that evaluation of whether a threshold for requesting a codec change has been satisfied can be performed within the RTP layer 302 of some example embodiments.

It will be appreciated that the system layer diagram 300 is provided by way of example, and not by way of limitation. In this regard, the system layer diagram 300 is not to be taken as being comprehensive of all system layers that may be implemented on a wireless communication device, such as wireless communication device 102. For example, one or more intermediate layers can be implemented between respective ones of the system layers 300 in accordance with some example embodiments. As a further example, one or more layers can be implemented above the RTP layer 302. Further, as described above, alternative arrangements in which the threshold evaluation module layer 304 is integrated into the RTP layer 302 or into the physical layer 306 are contemplated within the scope of the disclosure.

Figure 4:
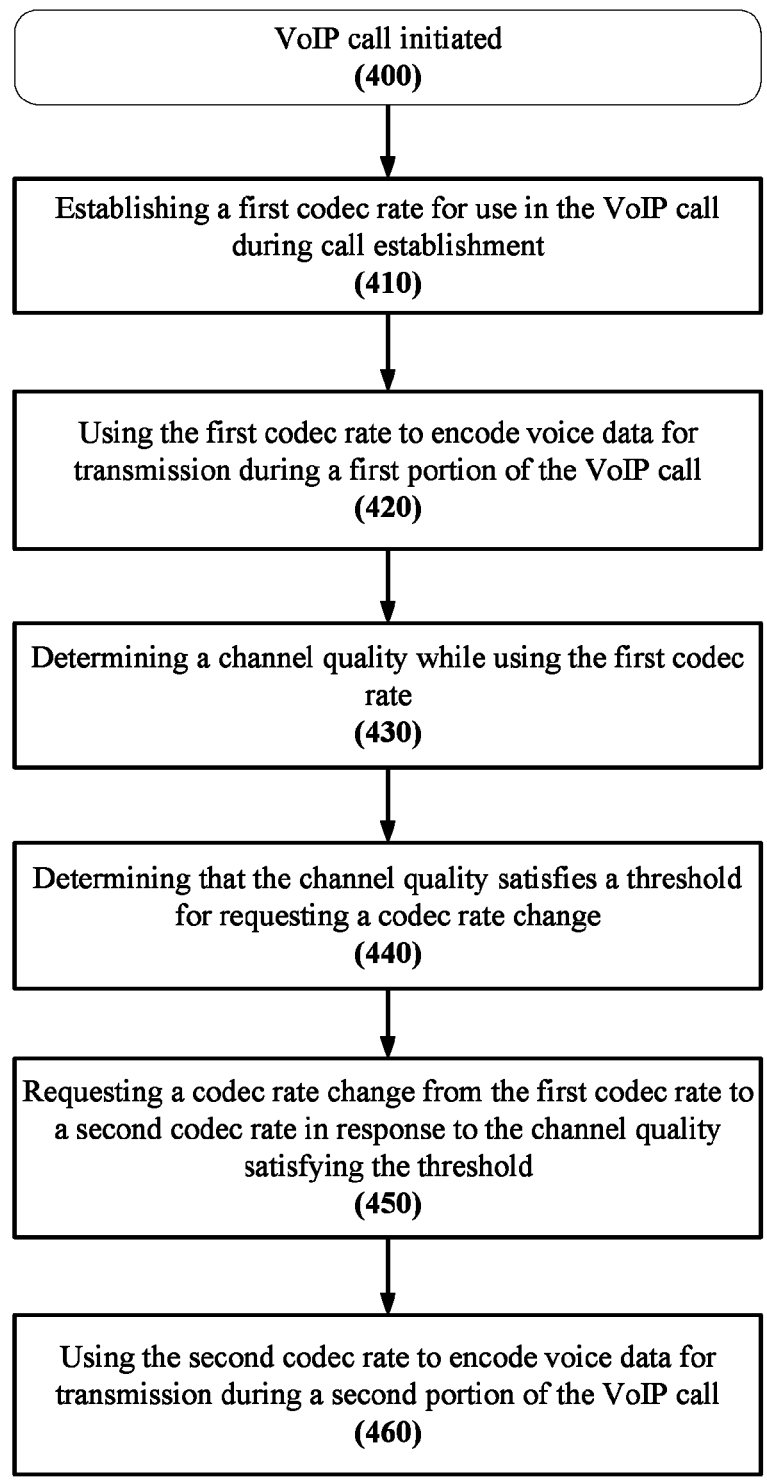
FIG. 4 illustrates a flow chart according to an example method for initiating a codec rate change during a voice over Internet Protocol VoIP call in accordance with some example embodiments.

FIG. 4 illustrates a flow chart according to an example method for initiating a codec rate change during a VoIP call in accordance with some example embodiments. In this regard, FIG. 4 illustrates operations that can be performed by a wireless communication device, such as wireless communication device 102, in accordance with some example embodiments. One or more of processing circuitry 210, processor 212, memory 214, transceiver 216, channel quality measurement module 218, threshold evaluation module 220, or codec change request module 222 can, for example, provide means for performing the operations illustrated in and described with respect to FIG. 4.

At operation 400, a VoIP call can be initiated. The VoIP call can be initiated by the wireless communication device 102, or can be initiated by another party participating in the call, such as the second communication device 104. In embodiments in which the wireless communication device 102 is accessing an LTE network, the VoIP call can be a VoLTE call. In some example embodiments in which the second communication device 104 is also participating in the call via an LTE connection, the VoIP call can be an end-to-end VoLTE call.

Operation 410 can include the wireless communication device 102 establishing a first codec rate for use in the VoIP call during call establishment. Establishment of the first codec rate can, for example, include negotiation between the wireless communication 102 and the second communication device 104 in accordance with a protocol that can be used by devices participating in a call to establish an initial codec rate. In some example embodiments, the first codec rate can be selected based at least in part on channel conditions observed at the time of establishment of the call.

In some example embodiments, the first codec rate can be a rate of an adaptive multi-rate (AMR) audio codec that can be used to encode audio data in a VoIP call. In this regard, some example embodiments can include switching between codec rates for an AMR audio codec during a call in response to a change in channel quality.

Operation 420 can include the wireless communication device 102 using the first codec rate to encode voice data for transmission during a first portion of the VoIP call.

Operation 430 can include the wireless communication device 102 determining a channel quality while using the first codec rate. Operation 430 can, for example, be performed by the channel quality measurement module 218. As such, operation 430 can include determining one or more of the channel quality metrics discussed above, such as, by way of non-limiting example, a signal quality measurement (e.g., RSRP, RSSI, RSRQ, and/or the like), an error rate experienced by the wireless communication device 102, a resource allocation (e.g., an MCS allocation) granted to the wireless communication device 102, and/or the like.

Operation 440 can include the wireless communication device 102 determining that the channel quality determined in operation 430 satisfies a threshold for requesting a codec rate change. Operation 440 can, for example, be performed by the threshold evaluation module 220.

Operation 450 can include the wireless communication device 102 requesting a codec rate change from the first codec rate to a second codec rate in response to the channel quality satisfying the threshold. Operation 450 can, for example, be performed by the codec change request module 222. In some example embodiments, operation 450 can include the wireless communication device 102 sending a CMR message.

Operation 460 can include the wireless communication device 102 using the second codec rate to encode voice data for transmission during a second portion of the VoIP call. In some example embodiments, operation 460 can be performed after some defined delay period (e.g., to give the second communication device 104 time to receive notice of the codec rate change) following requesting the codec rate change.

Figure 7:
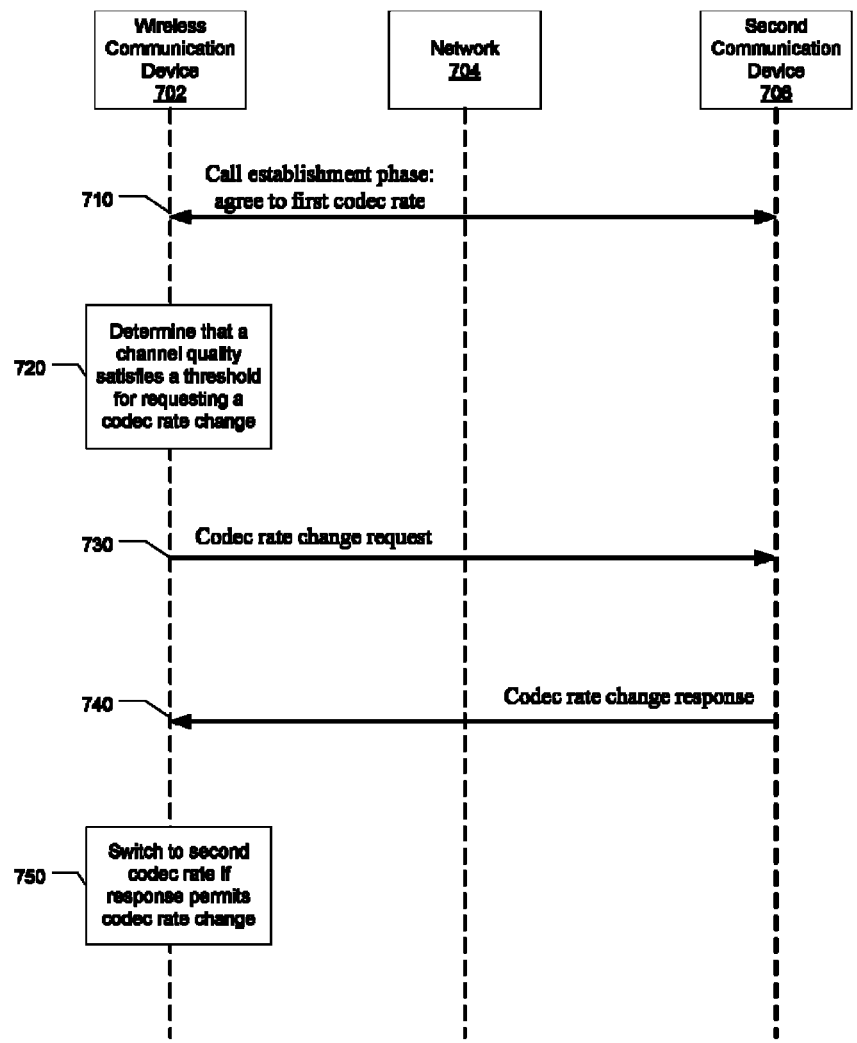
FIG. 7 illustrates a signaling diagram according to an example method for initiating a codec rate change during a voice over Internet Protocol VoIP call in accordance with some example embodiments.
Figure 8:
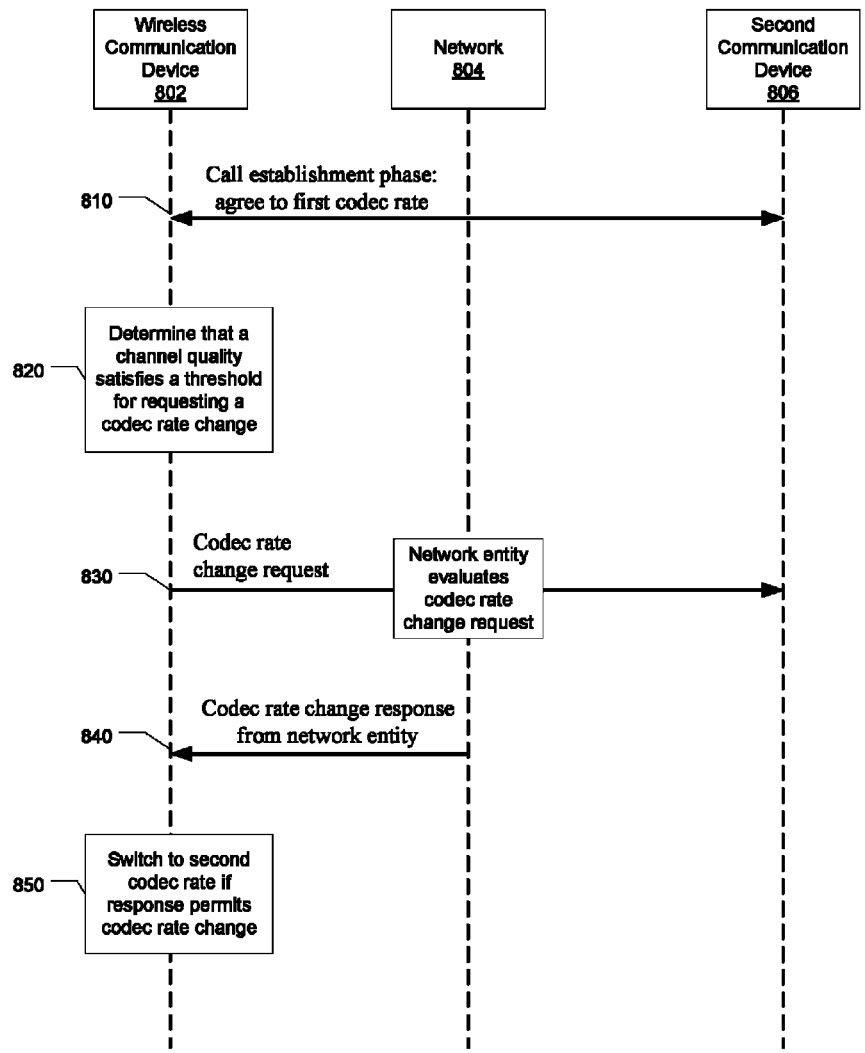
FIG. 8 illustrates a signaling diagram according to another example method for initiating a codec rate change during a voice over Internet Protocol VoIP call in accordance with some example embodiments.

In some example embodiments, such as those illustrated in and described with respect to the signaling diagrams of FIGS. 7 and 8, the wireless communication device 102 can wait for a response permitting the wireless communication device 102 to switch to the second codec rate prior to using the second codec rate. For example, the wireless communication device 102 can wait for a response from the second communication device 104 and/or a response from a network entity that can be responsible for arbitrating codec rate change requests. In such example embodiments, the wireless communication device 102 can continue to use the first codec rate, and operation 460 can be omitted, in an instance in which the wireless communication device 102 receives a message denying the request and/or otherwise does not receive a response permitting the wireless communication device 102 to switch to the second codec rate. In some example embodiments, the wireless communication device 102 can submit another request to switch to the second codec rate in an instance in which a response permitting the wireless communication device 102 to switch to the second codec rate is not received.

In some example embodiments, the second communication device 104 can also switch codec rates in response to the request such that audio data received by the wireless communication device 102 can also be encoded at the new codec rate.

In some example embodiments, the codec rate can be switched multiple times during a VoIP call in response to changing conditions. In this regard, the wireless communication device 102 can continue to determine channel quality and request to change codec rates as channel conditions evolve during the course of the call.

Figure 5:
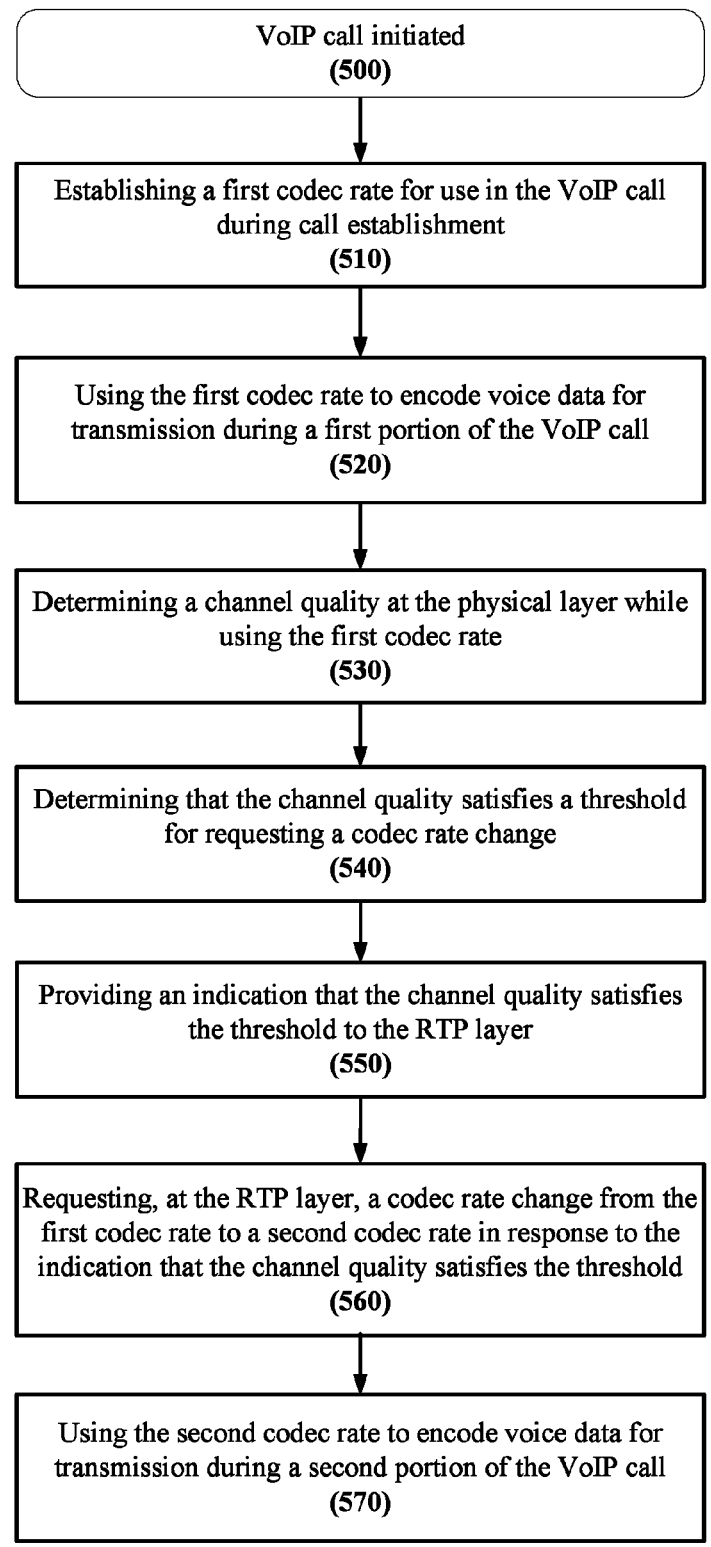
FIG. 5 illustrates a flow chart according to another example method for initiating a codec rate change during a voice over Internet Protocol VoIP call in accordance with some example embodiments.

FIG. 5 illustrates a flow chart according to another example method for initiating a codec rate change during a VoIP call in accordance with some example embodiments. More particularly, FIG. 5 illustrates an embodiment of the method of FIG. 4 in which initiation of a codec rate change can be facilitated by an intermediary between a physical layer and an RTP layer, such as in accordance with embodiments described with respect to the system layer diagram 300. One or more of processing circuitry 210, processor 212, memory 214, transceiver 216, channel quality measurement module 218, threshold evaluation module 220, or codec change request module 222 can, for example, provide means for performing the operations illustrated in and described with respect to FIG. 5.

At operation 500, a VoIP call can be initiated. The VoIP call can be initiated by the wireless communication device 102, or can be initiated by another party participating in the call, such as the second communication device 104. In embodiments in which the wireless communication device 102 is accessing an LTE network, the VoIP call can be a VoLTE call. In some example embodiments in which the second communication device 104 is also participating in the call via an LTE connection, the VoIP call can be an end-to-end VoLTE call.

Operation 510 can include the wireless communication device 102 establishing a first codec rate for use in the VoIP call during call establishment. In this regard, operation 510 can correspond to an embodiment of operation 410. Operation 520 can include the wireless communication device 102 using the first codec rate to encode voice data for transmission during a first portion of the VoIP call. Operation 520 can, for example, correspond to an embodiment of operation 420.

Operation 530 can include the wireless communication device 102 determining a channel quality at the physical layer (e.g., physical layer 302) while using the first codec rate. Operation 530 can, for example, correspond to an embodiment of operation 430.

Operation 540 can include the wireless communication device 102 determining that the channel quality satisfies a threshold for requesting a codec rate change. In this regard, operation 540 can, for example, correspond to an embodiment of operation 440.

Operation 550 can include the wireless communication device 102 providing an indication that the channel quality satisfies the threshold to the RTP layer (e.g., the RTP layer 306). For example, in some embodiments, a layer disposed between the physical layer and the RTP layer, such as the threshold evaluation module layer 304, can provide the indication to the RTP layer.

Operation 560 can include the wireless communication device 102 requesting, at the RTP layer, a codec rate change from the first codec rate to a second codec rate in response to the indication provided to the RTP layer in operation 550. In this regard, operation 560 can, for example, correspond to an embodiment of operation 450.

Operation 570 can include the wireless communication device 102 using the second codec rate to encode voice data for transmission during a second portion of the VoIP call. Operation 570 can, for example, correspond to an embodiment of operation 460.

Figure 6:
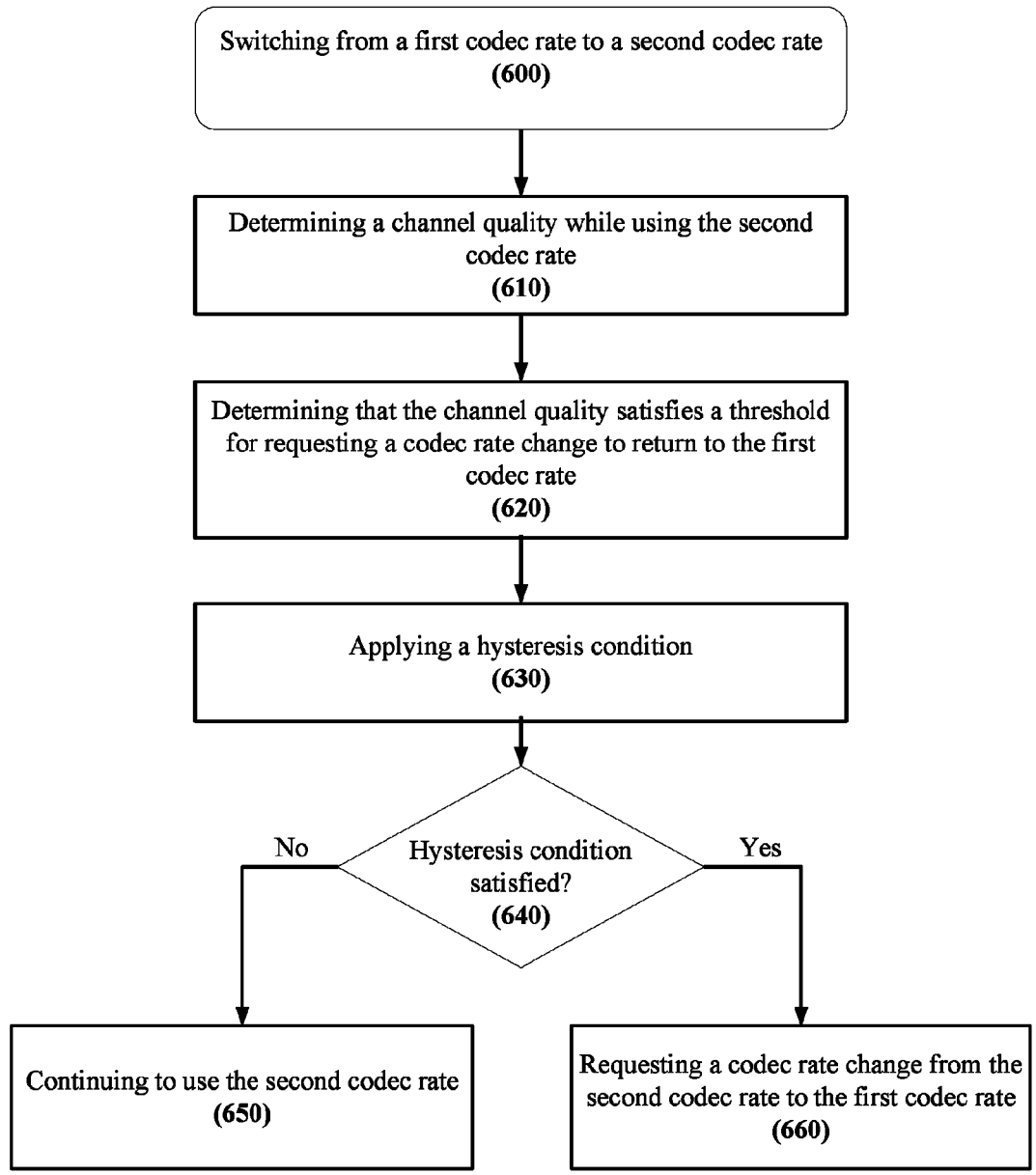
FIG. 6 illustrates a flow chart according to an example method for applying a hysteresis condition after switching codec rates during a call in accordance with some example embodiments.

As discussed above, in some example embodiments, a codec rate can be switched multiple times during a VoIP call in response to further changes in channel quality. In some such example embodiments, a hysteresis condition can be applied prior to switching codec rates a second time to avoid ping ponging between two codec rates. FIG. 6 illustrates a flow chart according to an example method for applying a hysteresis condition after switching codec rates during a call in accordance with some such example embodiments. In this regard, FIG. 6 illustrates operations that can be performed by a wireless communication device, such as wireless communication device 102, after switching from a first codec rate to a second codec rate, such as in accordance with the method of FIG. 4 and/or the method of FIG. 5. One or more of processing circuitry 210, processor 212, memory 214, transceiver 216, channel quality measurement module 218, threshold evaluation module 220, or codec change request module 222 can, for example, provide means for performing the operations illustrated in and described with respect to FIG. 6.

At operation 600, the wireless communication device 102 can switch from a first codec rate to a second codec rate. For example, operation 600 can correspond to operation 460 and/or operation 570.

Operation 610 can include the wireless communication device 102 determining a channel quality while using the second codec rate. Operation 610 can, for example, be performed by the channel quality measurement module 218.

Operation 620 can include the wireless communication device 102 determining that the channel quality determined in operation 610 satisfies a threshold for requesting a codec rate change to return to the first codec rate. Operation 620 can, for example, be performed by the threshold evaluation module 220.

Operation 630 can include the wireless communication device 102 applying a hysteresis condition before requesting a codec rate change to return to the first codec rate. The hysteresis condition can include determining whether the channel quality satisfying the threshold persists for some period. For example, operation 630 can include setting a timer to determine if the channel quality continues to persist at expiration of the timer. As another example, in some example embodiments, applying the hysteresis condition can include performing one or more further channel quality measurements to verify that the channel quality is not transient. For example, applying the hysteresis condition can include enforcing a policy that a defined number, n, channel quality measurements satisfy the threshold before requesting to return to the first codec rate. For example, in some embodiments, applying the hysteresis condition can include determining whether at least n consecutive channel quality measurements satisfy the threshold. As another example, in some embodiments, applying the hysteresis condition can include determining whether at least n of m sequential channel quality measurements, where m is an integer larger than n, satisfy the threshold.

Operation 640 can include the wireless communication device 102 determining whether the hysteresis condition applied in operation 630 is satisfied. In some example embodiments, the threshold evaluation module 220 can perform operations 630 and 640.

In an instance in which it is determined at operation 640 that the hysteresis condition is not satisfied, the method can proceed to operation 650, which can include the wireless communication device 102 continuing to use the second codec rate. If, however, it is determined at operation 640 that the hysteresis condition is satisfied, the method can instead proceed to operation 660, which can include the wireless communication device 102 requesting a codec rate change from the second codec rate to the first codec rate.

FIG. 7 illustrates a signaling diagram according to an example method for initiating a codec rate change during a voice over Internet Protocol VoIP call in accordance with some example embodiments. In this regard, FIG. 7 illustrates operations that can be performed by and signals that can be exchanged between a wireless communication device 702, network 704, and second communication device 706 in accordance with some example embodiments. The wireless communication device 702 can be an embodiment of the wireless communication device 102, and the second communication device 706 can be an embodiment of the second communication device 104. As such, it will be appreciated that one or more of processing circuitry 210, processor 212, memory 214, transceiver 216, channel quality measurement module 218, threshold evaluation module 220, or codec change request module 222 can, for example, provide means for performing the operations of the wireless communication device 702 in accordance with some example embodiments.

The network 704 can include one or more networks and/or elements of one or more networks, which can be configured to support a VoIP call, such as a VoLTE call, between the wireless communication device 702 and second communication device 706. For example, the network 704 can include one or more elements of a radio access network (RAN), such as the wireless network access point 108, to which the wireless communication device 702 can be connected. In embodiments in which the second communication device 706 is connected to a cellular network, the network 704 can further include one or more elements of a RAN to which the second communication device 706 can be connected. The network 704 can additionally include one or more elements of a core network, which can be interfaced with one or more cellular RANs. In some example embodiments, the network 704 can include one or more entities, such as an MTSI MGW, of an IMS that can be configured to support a VoIP call.

Operation 710 can include the wireless communication device 702 and second communication device 706 performing a call establishment phase attendant to initiation of a VoIP call, such as a VoLTE call. The call establishment phase can include the wireless communication device 702 and second communication device 706 agreeing to a first codec rate to be used by the wireless communication device 702.

Operation 720 can include the wireless communication device 702 determining that a channel quality satisfies a threshold for requesting a codec rate change. In this regard, operation 720 can, for example, correspond to an embodiment of operation 440 and/or operation 540.

Operation 730 can include the wireless communication device 702 sending a codec rate change request to the second communication device 706. The codec rate change request can, for example, be a CMR message. Operation 730 can, for example, correspond to an embodiment of operation 450 and/or operation 560.

After sending the codec rate change request, the wireless communication device 702 can wait for a codec rate change response from the second communication device 702 before switching to the second codec rate. The wireless communication device 702 can receive the codec rate change response, at operation 740. If the codec rate change response permits the wireless communication device 702 to switch to the second codec rate, the wireless communication device 702 can switch to the second codec rate, at operation 750. If, however, the codec rate change response denies the request to switch codec rates, the wireless communication device 702 can continue to use the first codec rate. Operation 750 can, for example, correspond to an embodiment of operation 460 and/or operation 570.

FIG. 8 illustrates a signaling diagram according to another example method for initiating a codec rate change during a voice over Internet Protocol VoIP call in accordance with some example embodiments. More particularly, FIG. 8 illustrates an example embodiment in which a network entity can arbitrate a codec rate change request and permit or deny the request. FIG. 8 illustrates operations that can be performed by and signals that can be exchanged between a wireless communication device 802, network 804, and second communication device 806 in accordance with some example embodiments. The wireless communication device 802 can be an embodiment of the wireless communication device 102, and the second communication device 806 can be an embodiment of the second communication device 104. As such, it will be appreciated that one or more of processing circuitry 210, processor 212, memory 214, transceiver 216, channel quality measurement module 218, threshold evaluation module 220, or codec change request module 222 can, for example, provide means for performing the operations of the wireless communication device 802 in accordance with some example embodiments.

The network 804 can include one or more networks and/or elements of one or more networks, which can be configured to support a VoIP call, such as a VoLTE call, between the wireless communication device 802 and second communication device 806. For example, the network 804 can include one or more elements of a radio access network (RAN), such as the wireless network access point 108, to which the wireless communication device 802 can be connected. In embodiments in which the second communication device 806 is connected to a cellular network, the network 804 can further include one or more elements of a RAN to which the second communication device 806 can be connected. The network 804 can additionally include one or more elements of a core network, which can be interfaced with one or more cellular RANs. In some example embodiments, the network 804 can include one or more entities, such as an MTSI MGW, of an IMS that can be configured to support a VoIP call.

Operation 810 can include the wireless communication device 802 and second communication device 806 performing a call establishment phase attendant to initiation of a VoIP call, such as a VoLTE call. The call establishment phase can include the wireless communication device 802 and second communication device 806 agreeing to a first codec rate to be used by the wireless communication device 802.

Operation 820 can include the wireless communication device 802 determining that a channel quality satisfies a threshold for requesting a codec rate change. In this regard, operation 820 can, for example, correspond to an embodiment of operation 440 and/or operation 540.

Operation 830 can include the wireless communication device 802 sending a codec rate change request to the network 804 and/or to the second communication device 806. The codec rate change request can, for example, be a CMR message. Operation 830 can, for example, correspond to an embodiment of operation 450 and/or operation 560.

After sending the codec rate change request, the wireless communication device 802 can wait for a codec rate change response before switching to the second codec rate. In the embodiment of FIG. 8, a network entity of the network 804 can see the codec rate change and can arbitrate the codec change request. The wireless communication device 802 can receive a codec rate change response from the network entity, at operation 840. If the codec rate change response permits the wireless communication device 802 to switch to the second codec rate, the wireless communication device 802 can switch to the second codec rate, at operation 850. If, however, the codec rate change response denies the request to switch codec rates, the wireless communication device 802 can continue to use the first codec rate. Operation 850 can, for example, correspond to an embodiment of operation 460 and/or operation 570.

The various aspects, embodiments, implementations or features of the described embodiments can be used separately or in any combination. Various aspects of the described embodiments can be implemented by software, hardware or a combination of hardware and software. The described embodiments can also be embodied as a computer readable medium (or mediums) storing computer readable code including instructions that can be performed by one or more computing devices. The computer readable medium may be associated with any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code may be stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments. For example, it will be appreciated that the ordering of operations illustrated in the flowcharts is non-limiting, such that the ordering of two or more operations illustrated in and described with respect to a flowchart can be changed in accordance with some example embodiments. As another example, it will be appreciated that in some embodiments, one or more operations illustrated in and described with respect to a flowchart can be optional, and can be omitted.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. An apparatus configurable for operation in a wireless device, the apparatus comprising:
   processing circuitry including one or more processors communicatively coupled with memory storing instructions that, when executed by the one or more processors, cause the wireless device to:
   establish a first codec rate for use in a voice over LTE (VoLTE) call during a call establishment phase;
   use the first codec rate to encode voice data for transmission during a first portion of the VoLTE call;
   determine channel quality while using the first codec rate;
   determine that the channel quality while using the first codec rate satisfies a first threshold for requesting a codec rate change;
   request the codec rate change from the first codec rate to a second codec rate in response to the channel quality satisfying the first threshold for requesting the codec rate change;
   use the second codec rate to encode voice data for transmission during a second portion of the VoLTE call;
   determine the channel quality while using the second codec rate;
   determine that the channel quality while using the second codec rate satisfies a second threshold for requesting a codec rate change to return to the first codec rate;
   apply a hysteresis condition before requesting the codec rate change to return to the first codec rate;
   request the codec rate change to return to the first codec rate when the hysteresis condition is satisfied; and
   continue to use the second codec rate when the hysteresis condition is not satisfied.

2. The apparatus of claim 1, wherein the wireless device determines the hysteresis condition is satisfied based at least in part on the channel quality satisfying the second threshold for at least a defined number of consecutive channel quality measurements.

3. The apparatus of claim 1, wherein execution of the instructions further causes the wireless device to:
   determine the channel quality at a physical layer;
   provide an indication that the channel quality satisfies the first threshold or the second threshold to a real-time transport protocol (RTP) layer; and
   request the codec rate change at the RTP layer in response to the indication that the channel quality satisfies the first threshold or the second threshold.

4. The apparatus of claim 3, wherein execution of the instructions further causes the wireless device to:
   determine that the channel quality satisfies the first threshold or the second threshold at an intermediary layer disposed between the physical layer and the RTP layer; and
   provide the indication that the channel quality satisfies the first threshold or the second threshold from the intermediary layer disposed between the physical layer and the RTP layer to the RTP layer.

5. The apparatus of claim 1, wherein execution of the instructions further causes the wireless device to:
   determine the channel quality at least in part by controlling the wireless device to determine a modulation and coding scheme (MCS) allocation for the wireless device;
   determine that the channel quality satisfies the first threshold or the second threshold at least in part by controlling the wireless device to determine that a voice packet encoded using the first codec rate is too large to transmit in a single transmission time interval (TTI) given the MCS allocation; and
   request the codec rate change from the first codec rate to the second codec rate at least in part by controlling the wireless device to request a codec rate change to a lower bit rate than the first codec rate.

6. The apparatus of claim 1, wherein execution of the instructions further causes the wireless device to:
   determine the channel quality at least in part by controlling the wireless device to measure one or more of a reference signal received power (RSRP), a received signal strength indicator (RSSI), or a reference signal received quality (RSRQ); and
   determine that the channel quality satisfies the first threshold or the second threshold at least in part by controlling the wireless device to determine that one or more of an RSRP threshold, an RSSI threshold, or an RSRQ threshold is satisfied.

7. The apparatus of claim 1, wherein execution of the instructions further causes the wireless device to:
   determine the channel quality at least in part by controlling the wireless device to determine an error rate; and
   determine that the channel quality satisfies the first threshold or the second threshold at least in part by controlling the wireless device to determine that the error rate satisfies a threshold error rate.

8. The apparatus of claim 1, wherein execution of the instructions further causes the wireless device to:
   wait for a positive response permitting the wireless device to switch to the second codec rate before using the second codec rate; and
   continue to use the first codec rate in response to receipt of a negative response denying the wireless device to switch to the second codec rate.

9. The apparatus of claim 1, wherein requests to change codec rates comprise codec mode request (CMR) messages.

10. The apparatus of claim 1, wherein the wireless device determines the hysteresis condition is satisfied based at least in part on the channel quality satisfying the second threshold for at least a pre-defined period of time.

11. A wireless device comprising:
one or more antennas;
a transceiver configurable to transmit signals to and receive signals from a wireless network via the one or more antennas; and
one or more processors communicatively coupled with memory storing instructions that, when executed by the one or more processors, cause the wireless device to:
establish a Voice over Internet Protocol (VoIP) call with a second wireless device via the wireless network;
use a first codec rate for encoding voice data transmitted to the second wireless device;
measure a channel quality at the physical layer while using the first codec rate;
determine the channel quality satisfies a first threshold at an intermediary layer between the physical layer and a real-time transport (RTP) layer;
provide an indication from the intermediary layer to the RTP layer when the channel quality satisfies the first threshold;
send a request to the second wireless device to change from the first codec rate to a second codec rate in response to receipt of the indication by the RTP layer from the intermediary layer;
switch to use the second codec rate in response to receipt of a positive indication from the second wireless device permitting the requested change from the first codec rate to the second codec rate; and
continue to use the first codec rate in response to receipt of a negative indication from the second wireless device denying the requested change from the first codec rate to the second codec rate.

12. The wireless device of claim 11, wherein:
the wireless network operates in accordance with a Long Term Evolution (LTE) wireless communication protocol; and
the VoIP call comprises a Voice over LTE (VoLTE) call between the wireless device and the second wireless device.

13. The wireless device of claim 12, wherein execution of the instructions further causes the wireless device to:
send the request to the second wireless device to change from the first codec rate to the second codec rate after receiving a positive indication allowing a codec rate change from a network entity of the wireless network, wherein the network entity arbitrates codec rate changes for the VoLTE call.

14. The wireless device of claim 11, wherein the wireless device and second wireless device negotiate to use the first codec rate when establishing the VoIP call.

15. The wireless device of claim 11, wherein the request to the second wireless device comprises a codec mode request (CMR) message requesting the change from the first codec rate to the second codec rate.

16. The wireless device of claim 11, wherein execution of the instructions further causes the wireless device to:
apply a hysteresis condition before sending a second request to the second wireless device to change from the second codec rate to the first codec rate in response to the channel quality satisfying a second threshold while using the second codec rate;
send the second request to the second wireless device to change from the second codec rate to the first codec rate when the hysteresis condition is satisfied; and
continue to use the second codec rate without sending the second request to the second wireless device when the hysteresis condition is not satisfied.

17. An apparatus configurable for operation in a wireless device, the apparatus comprising:
processing circuitry including one or more processors communicatively coupled with memory storing instructions that, when executed by the one or more processors, cause the wireless device to:
establish a Voice over Internet Protocol (VoIP) call with a second wireless device via a wireless network;
use a first codec rate for encoding voice data transmitted to the second wireless device;
measure a channel quality at a physical layer while using the first codec rate;
determine the channel quality satisfies a first threshold at an intermediary layer between the physical layer and a real-time transport (RTP) layer;
provide an indication from the intermediary layer to the RTP layer when the channel quality satisfies the first threshold;
send a request to the second wireless device to change from the first codec rate to a second codec rate in response to receipt of the indication by the RTP layer from the intermediary layer;
switch to use the second codec rate in response to receipt of a positive indication from the second wireless device permitting the requested change from the first codec rate to the second codec rate; and
continue to use the first codec rate in response to receipt of a negative indication from the second wireless device denying the requested change from the first codec rate to the second codec rate.

18. The apparatus of claim 17, wherein:
the wireless network comprises a Long Term Evolution (LTE) network; and
the VoIP call comprises a Voice over LTE (VoLTE) call.

19. The apparatus of claim 18, wherein execution of the instructions further causes the wireless device to:
send the request to the second wireless device to change from the first codec rate to the second codec rate after receiving a positive indication allowing a codec rate change from a network entity of the wireless network, wherein the network entity arbitrates codec rate changes for the VoLTE call.

20. The apparatus of claim 17, wherein execution of the instructions further causes the wireless device to:
apply a hysteresis condition before sending a second request to the second wireless device to change from the second codec rate to the first codec rate in response to the channel quality satisfying a second threshold while using the second codec rate;
send the second request to the second wireless device to change from the second codec rate to the first codec rate when the hysteresis condition is satisfied; and
continue to use the second codec rate without sending the second request to the second wireless device when the hysteresis condition is not satisfied.

* * * * *